United States Patent

[11] 3,563,402

| [72] | Inventor | Heinrich Arnold<br>Maetzelweg 7, Hamburg-Volksdorf,<br>Germany |
|---|---|---|
| [21] | Appl. No. | 704,235 |
| [22] | Filed | Feb. 9, 1968 |
| [45] | Patented | Feb. 16, 1971<br>Continuation-in-part of application Ser. No.<br>507,651, Nov. 15, 1965, now abandoned. |

[54] PLASTIC GASKET RINGS AND GASKET LININGS
11 Claims, No Drawings

[52] U.S. Cl.................................................. 215/40,
117/132, 260/23, 260/30.6, 260/32.6, 260/890,
260/899, 260/23.7, 260/28.5, 260/31.8,
260/32.6, 260/41, 260/41.5, 260/890, 260/897,
260/898, 260/899, 260/901
[51] Int. Cl......................................................... B65d 53/06
[50] Field of Search............................................ 260/23.7,
23.7 (H), 23.7 (N), 23 (X), 31.8, 30.6, 890, 891;
215/40

[56]  References Cited
UNITED STATES PATENTS

| 2,330,353 | 9/1943 | Henderson.................... | 260/891 |
|---|---|---|---|
| 2,579,572 | 12/1951 | Hendricks..................... | 260/23X |
| 2,674,546 | 4/1954 | Greenhalgh et al........... | 117/128.4 |
| 2,986,411 | 5/1961 | Anderson...................... | 285/291 |
| 3,142,401 | 7/1964 | Foss et al. ..................... | 215/40 |
| 3,151,186 | 9/1964 | Lucke ........................... | 260/891 |
| 3,231,529 | 1/1966 | Kuhn et al. ................... | 260/23 |
| 3,356,625 | 12/1967 | Giessler........................ | 260/23 |

*Primary Examiner*—Donald E. Czaja
*Assistant Examiner*—Donald J. Barrack
*Attorney*—Burgess, Dinklage & Sprung ABSTRACT: Improved gasket linings or rings prepared from novel plastic compositions which are resistant to thermal and mechanical stresses encountered in use, and, when incorporated in a closure, as, for instance, for a glass container, provide a hermetic seal therefor. The plastic compositions comprise a mixture of 50 parts by weight of a polyvinylchloride or a copolymer of vinylchloride with either vinylidene chloride or vinyl acetate, 10—100 parts by weight of a plasticizer into which there has been incorporated 5—200 parts by weight of synthetic rubber. The mixture, after having been worked to form a homogeneous paste, is flowed onto the inner surface of a metal cap, hood, or like closure and thereafter heat treated whereby the plastic is converted into a gel. Following cooling, the gel is converted into a viscous and coherent film and constitutes the gasket ring or lining.

PLASTIC GASKET RINGS AND GASKET LININGS

This application is a continuation-in-part of application Ser. No. 507,651 filed Nov. 15, 1965 now abandoned.

This invention relates to plastic gasket rings and gasket linings and more particularly to a closure provided with a plastic gasket ring or lining.

The canning industry utilizes various different processes in connection with the preserving of food. According to one process, the hot filling compound is filled into the glasses. According to a second process, the closed container is pasteurized at temperatures between 80 and 100° C. According to a third process, the closed containers are sterilized at temperatures of more than 100° C. Gasket rings or gasket linings which are manufactured from polyvinylchloride resins in admixture with plasticizers have the disadvantage that they cannot for the same composition be treated at all of the temperatures to be applied in the sterilization. Thus it becomes necessary that depending on the sterilization temperature required, the composition must be adjusted with respect to the polyvinylchloride and plasticizer contents. Generally, in the case of sterilization temperatures of more than 100° C., there are used relatively rough gasket rings, while in the case of temperatures of below 100° C., plasticizer-containing mixtures are employed. In the case where the sterilization temperature and the gasket material are not chosen to conform to each other, there is the risk that on sterilization the gasket ring will be cut through by the glass rim.

The gasket linings for closures, i.e., caps or screw caps, as heretofore available, have been produced from a wide variety of plastic materials, including polyethylene, polyvinylchloride, polystyrene, nylon, and other flexible and rigid materials. These materials have been employed per se and in admixture with plasticizers, fillers, and the like.

These linings and gaskets, in addition to the disadvantages as above set out, have the disadvantage of not being sufficiently compressible, resulting, in use, in deterioration of the tightness of the seal, so that an airtight closure is no longer present. To avoid such disadvantage, it has been proposed to prepare gasket linings and rings on the basis of vinyl resins treated with plasticizers, and which, in addition, have, incorporated therein, blowing agents. The latter plasticized vinyl resin on being subjected to heat, during the setting or solidifying, results in the formation of a foamed, i.e., pore-containing, material. The gaskets produced on the basis of this foam material have the disadvantage that porous materials undergo considerable shrinkage; they are not resistant to heat and, accordingly, cannot be sterilized. On exposure to heat, especially in the range required for sterilization, they undergo deformation and no longer provide a satisfactory seal.

Accordingly, an object of the invention is a gasket ring or gasket lining providing a dependable seal and which is resistant to the thermal and mechanical stresses encountered in use.

A further object of the invention is to provide a closure including a gasket ring or gasket lining, whereby an air tight sealing of a container can be obtained.

Another object of the invention is to provide new and improved plastic materials which are characterized by increased resistance to mechanical and thermal stress.

It is another object of the invention to provide gasket rings aNd gasket linings which can be utilized for any of the conventional methods utilized in the preservation of food.

It is also an object of the invention to provide gasket rings and gasket linings which can be satisfactorily utilized in canning procedures requiring temperatures below 100° C. as well as those carried out at temperatures of more than 100° C.

Still another object of the invention is to provide closures including gasket rings or gasket linings whereby the containers sealed with such closures are assured an absolutely hermetic seal.

Yet another object of the invention is to provide closures including gasket rings and gasket linings, which permit establishing in the sterilized glasses sealed with such closures, an increased vacuum, which vacuum is maintained constant even on prolonged storage.

Still another object of the invention is that also in case of longer storage, the vacuum within the sterilized glasses remains constant.

Other objects and advantages of the invention will become apparent as the specification proceeds.

In accordance with the invention, there is provided an improved gasket ring or gasket lining, characterized by increased resistance to mechanical and thermal stress, which is prepared by heat treating, a plastic resin composition, composed of a flowable mixture of a resin, selected from the group consisting of polyvinylchloride, polymers of vinyl chloride with vinylidene chloride and polymers of vinylchloride with vinyl acetate, a nonvolatile plasticizer in which the said resins are insoluble, except at elevated temperatures and a synthetic rubber, the latter in particle form.

In the plastic resin composition the particles of synthetic rubber have a solid core which is surrounded by a covering layer of material swollen by plasticizer whereby the swollen state of the rubber particle increases from the core outwardly so that there results a smooth conversion from the solid to the liquid phase.

Further in accordance with the invention, it has been found that the improved gasket rings and gasket linings can be utilized in any of the available methods for preservation of food as herein involved. This is true in the case of temperatures below 100° C. as well as in the case of temperatures of more than 100° C. The glass containers which are sealed with closures which contain the gasket materials according to the invention, are characterized by an outstanding sealing ability. The gasket materials according to the invention result in closures having the following superior properties: they allow for the development of a considerable vacuum within the sterilized glass, which, even in the case of long periods of storage, remains constant in the glass; different types of glass openings can be utilized, in any case, there results an absolutely hermetic sealing of the glass.

Thus the gasket rings or linings in accordance with the invention are not associated with any of the disadvantages encountered with gaskets formed of cellular structures, which break down on heat treatment or undergo deformation on the application of pressure thereto, as, for example, where the closure is applied and tightened with respect to another surface. Further, the extraction rings and linings according to the present invention are characterized by excellent resistance to oil and grease. The presence of the rubber permits the use in the gasket ring or lining of a smaller content of plasticizer whereby the storageability of the plastic resin composition is increased and the extraction values of the gasket rings and gasket linings are improved. They additionally exhibit the same degree of elasticity as is associated with foamed materials, but with none of their disadvantages. In spite of the high degree of elasticity, the gasket linings and rings produced in accordance with the invention will not be deformed out of shape, or cut through by the glass rim of an opposing surface to which the closure containing the same has been applied on such heat treatment as, for instance, is required during sterilization.

The gasket linings and rings in accordance with the invention are prepared from materials which do not contain any solvent. However, there may be incorporated into the plastic resin composition the conventional lubricants, pigments, fillers, vulcanization agents, etc., as well as such materials as solid polyethylene.

The gasket ring or lining is prepared by flowing the plastic resin composition onto the inner surface of a metal, cap, hood, or like closure, and thereafter heat treating the same to effect solidification. Under the action of the applied heat, the plastic resin composition is converted into a durable gel. Following cooling, the said plastic gasket ring or gasket lining is characterized by rubberlike and elastic properties.

The plastic mixtures which are flowed onto the cap or like closure are fluid in nature and have an efflux-time, measured in an efflux-cup (Ford) having a nozzle width of 8 mm., at a temperature of 21° C. of between 40 and 60 seconds. The said plastic mixtures comprise dispersions of the synthetic rubber material in a mixture of a polyvinylchloride resin and a nonvolatile plasticizer. On heating to the temperature required to effect the solidification, the polyvinylchloride resin becomes soluble in the plasticizer forming a gel like past which, on further heating, loses its liquid form. Following cooling, there is obtained a gasket ring or a gasket lining in said hood, cap or closure.

The resin component of the plastic resin composition may consist of polyvinylchloride or a copolymer or vinylchloride with another vinyl compound such as vinylidene chloride or vinyl acetate.

As plasticizer component, there may be utilized any of the known nonvolatile plasticizers which are compatible with polyvinylchloride resins and which do not prevent solidification of the polyvinylchloride resin under the influence of the increased temperatures. Illustrative of suitable nonvolatile plasticizers are the following: tricresylphosphate, acetyltributyl-citrate, dioctylphthalate, di-iso-octylphthalate, di-nonylphthalate, di-decylphthalate, sebacic acid di-ester, and adipic acid di-ester.

The rubber which is incorporated into the plastic resin composition is a synthetic rubber as, for instance, a butadiene-styrene-copolymer, a butadiene-acrylonitrile copolymer, polychloroprene, chlorsulfonated polyethylene, and the like. The aforesaid rubber may be used individually or in the form of a mixture thereof. The particle size of the rubber is characterized in that 100 percent of the powdery rubber is able to pass through a Tyler-sieve No. 14.

In the manufacture of the improved gasket rings and gasket linings in accordance with the invention, there is employed a plastic resin composition, having a content of plasticizer of 20 percent by weight up to 200 percent by weight, referred to the polyvinylchloride.

The use of the plasticizer in the broad ranges disclosed could not have been foreseen and makes possible the production of versatile and varied gasket rings and gasket linings having different types and degrees of elasticity.

The gasket rings and gasket linings according to the present invention are rubberlike in character. If amounts of plasticizer in the lower permissible range are employed, the resistance of a plastic to oils is considerably increased. For this reason, numerous new fields of application for gasket linings and gasket rings are made available. In particular, the gasket linings and rings of the invention may now be utilized in such new applications as in the metal—i.e., tin can—industry. Thus, the gasket rings and gasket linings provide a genuine technical advance.

The plastic resin composition of the invention comprises mixtures of polyvinylchloride with a nonvolatile plasticizer consisting of 50 parts by weight of polyvinylchloride and 10 to 100 parts by weight of a plasticizer into which there have been incorporated 5—200 parts by weight of a synthetic rubber. The resulting mixture is worked to form a homogeneous paste following which from 0 to 5 parts by weight and preferably 0.5 to 5 parts by weight of a lubricating agent and 0 to 5 parts by weight and preferably 2 to 5 parts by weight of a pigment, such as titanium dioxide, iron oxide red, and the like are added:

Other conventional additives may also be added, the resulting mixture being thoroughly worked to uniformly incorporate the same.

The invention is illustrated by certain preferred embodiments thereof although it will be understood that the invention is not limited thereby unless otherwise specifically indicated.

EXAMPLE 1

Fifty parts by weight of polyvinylchloride and 100 hundred parts by weight of tri-cresylphosphate were thoroughly admixed fifty parts by weight of a butadiene acrylonitrile polymer with approximately 40 percent by weight of nitrile content in particle form were then introduced into the mixture. The particle size was regulated so that 100 percent of the powdery nitrile rubber was able to pass through a Tyler-sieve No. 14. The specific weight amounted to 1.03. The mixture thus obtained was worked, a pastelike mass being obtained. 0.15 parts by weight of a lubricating agent and 2 parts by weight of titanium dioxide were then worked into the resulting paste.

By means of an automatic spraying device, the plastic mixture was flowed onto the inner surface of a closure, i.e., cap, for use in sealing preserve jars to form an annular gasket.

The cap which had been provided with such annular gasket was then heated in a dry oven for 5 minutes at a temperature of 160° C. The temperature could be increased up to 220° C., and the heating time reduced to 45 sec., the heating time employed being varied in dependence on the temperature used. Thereafter, the lid was removed from the oven and allowed to cool off. The gasket lining which was thereby obtained was characterized by its elasticity and rubberlike consistency and was possessed of a smooth surface. The gasket lining demonstrated excellent adhesion to the lid. After boiling for one hour at a temperature of 121° C. with salad oil present in the container to which the lid had been applied, the lining remained unchanged. It did not become greasy and there was no evidence of deformation or size change. The original elasticity was substantially completely maintained.

On application of such closure provided with a gasket ring, there was obtained a hermetic seal which was maintained intact even on exposure to higher temperatures, as for instance required for sterilization. This was true even where heavy pressure was applied to the gasket lining. The gasket lining was not cut through by the rim of the glass container. The hermetic seal was maintained in the glass containers which had been sealed using the lids in accordance with the invention.

EXAMPLE 2

Example 1 was repeated, using 40 parts by weight of di-iso-phthalate in place of the 100 parts by weight of tricresylphosphate. In all other instances, the procedure and working remained the same. Substantially identical results were obtained.

EXAMPLE 3

Example 1 was repeated using a plastic mixture prepared as set out in example 1, but constituted of the following components:

50 parts by weight of a copolymer of vinylchloride;
100 parts by weight of didecylphthalate;
200 parts by weight of butadiene-styrene copolymer according to example 1;
5 parts by weight of iron oxide red; and
5 parts by weight of a lubricating agent.

On further working, as set out in example 1, a gasket lining substantially as described in example 1 was obtained.

EXAMPLE 4

By means of a kneading machine there were prepared, according to the conventional method, four plastic resin compositions A, B, C and D, having the compositions set out in table 1 which follows. The components are present in parts by weight.

TABLE 1

| Plastic resin composition | A | B | C | D |
|---|---|---|---|---|
| Polyvinylchloride | 40 | 40 | 30 | 30 |
| Acetylbutylcitrate | 45 | 45 | 40 | 40 |
| Butadiene-acrylonitrile synthetic rubber according to Example 1 | | | 5 | 5 |
| Calcium ricinoleate | 1 | 1 | 1 | 1 |
| Oleic acid-amide | | 1 | | 1 |
| Paraffin (fusing point: 52° C.) | | 1 | | 1 |
| Barium sulfate | 5 | 5 | 5 | 5 |

Plastic resin compositions C and D contained the same butadiene-acrylonitrile polymer as was employed in Example 1. Plastic resin compositions A and B correspond in their composition with known gasket materials and serve as comparison materials. Plastic resin compositions B and D additionally contain lubricating agents.

By means of an automatic spraying device, the compositions were applied to form annular gasket materials on aluminum closures, having a diameter of 83 mm. Using each plastic resin composition, there was manufactured a lid which contained different quantities of plastic resin composition. Thus one closure might have a quantity of resin amounting to 1,000 mg. and another plastic resin amounting to 1,300 mg. The closures provided with the plastic resin compositions were then baked for a period of 90 seconds at a baking temperature of 200 to 210° C. Following cooling, rubberlike elastic gasket linings were obtained, each being provided with a smooth surface. The resultant closures or lids were then used for the sealing of suitable glasses. The following experiments were carried out with the sealed glasses:

EXPERIMENT No. 1

Water having a temperature of 80° C. was poured into the glasses. After sealing of the lids the glasses, following measuring of the vacuum, were cooled down. Thereafter the vacuum was determined, and again measured after a period of 10 days, 10 weeks and 6 months. The noted values are set out in table 2 which follows. The results very clearly demonstrate that those glasses which were sealed by means of closures provided with gasket rings containing butadiene-acrylonitrile rubber (plastic resin C and D) were characterized by their extraordinarily great sealing ability as compared to plastic resin compositions A and B. The initial vacuum as well as the final value observed after a period of 6 months was greater when plastic resin compositions C and D were utilized and the vacuum, above all, remained constant throughout. Even in the case of the closures provided with a content only of 1,000 mg. there was evidenced an unobjectionable sealing ability in the case of utilization of plastic resin compositions C and D.

EXPERIMENT No. 2

Water having a temperature of 80° C. was poured into glass containers. After sealing, the glasses were pasteurized for a period of one hour at a temperature of 100° C. Following the cooling down of the glasses, the vacuum was measured and then the measurement was repeated after a period of 10 days, 10 weeks and 6 months. The results are set out in table 2 and clearly demonstrate that in the case of the utilization of plastic resin compositions C and D, the vacuum remains constant. In contrast, when plastic resin compositions A and B were used this was not the case.

EXPERIMENT No. 3

The sealed glasses filled with water and provided with lids were sterilized for a sterilization period of one hour (sterilization pressure 1 atu, temperature 121° C., counter pressure 0.7 atu, total pressure 1.7 atu). The vacuum was determined just after cooling down of the glasses, and again after a period of 10 days, 10 weeks and 6 months. The values which were obtained are set out in table 2. Also, in this case, a distinct superiority of the plastic resin compositions C and D is to be observed.

EXPERIMENT No. 4

Glasses which had been filled with water and which were provided with the prepared lids were sterilized for a sterilization period of 2 hours (sterilization pressure 1 atu, temperature 121° C., counter pressure 1 atu, total pressure 2 atu). The results which were obtained, are set out in table 2. Even in the case of this great stress, the vacuum remains substantially constant in the case of those glasses which had been provided with gaskets on the basis of plastic resin compositions C and D. The sterilization conditions which have been set out are thus applied in the canning industry for the stabilization, i.e., sterilization, of meat and meat products, in order to destroy germs and bacteria. Glasses of such type, provided with closures containing the plastic resin composition A in an amount of 1,000 mg., are not able to maintain the vacuum constant. In the case of closures containing plastic in an amount of 1,300 mg. there was obtained a smaller vacuum than in the case of plastic resin compositions C and D, however, 10 percent of the glasses were wasted, because the gasket rings had been cut through by the rim of the glass. Thus no vacuum had been achieved.

The four experiments clearly demonstrate the distinct superiority of the plastic resin compositions C and D according to the invention as compared to the known plastic resin compositions A and B.

The vacuum was measured by means of a manometer, which indicates values between 0 and 1. Thus an index 0 means that no vacuum was present and an index 1 means that a 100 percent vacuum was present. The values read off between 0 and 1 demonstrate the vacuum.

TABLE 2

| Plastic resin composition | Quantity | Test | Vacuum after— Cooling down | 10 days | 10 weeks | 6 months |
|---|---|---|---|---|---|---|
| A | 1,000 | 1 | 0.200 | 0.180 | 0.160 | 0.000 |
| A | 1,300 | 1 | 0.250 | 0.240 | 0.240 | 0.230 |
| B | 1,000 | 1 | 0.200 | 0.180 | 0.160 | 0.000 |
| B | 1,300 | 1 | 0.250 | 0.240 | 0.240 | 0.230 |
| C | 1,000 | 1 | 0.280 | 0.280 | 0.280 | 0.280 |
| C | 1,300 | 1 | 0.350 | 0.250 | 0.350 | 0.350 |
| D | 1,000 | 1 | 0.280 | 0.280 | 0.280 | 0.280 |
| D | 1,300 | 1 | 0.350 | 0.350 | 0.350 | 0.350 |
| A | 1,000 | 2 | 0.220 | 0.180 | 0.160 | 0.050 |
| A | 1,300 | 2 | 0.280 | 0.260 | 0.250 | 0.240 |
| B | 1,000 | 2 | 0.220 | 0.180 | 0.160 | 0.050 |
| B | 1,300 | 2 | 0.280 | 0.260 | 0.250 | 0.240 |
| C | 1,000 | 2 | 0.340 | 0.340 | 0.340 | 0.340 |
| C | 1,300 | 2 | 0.380 | 0.380 | 0.380 | 0.380 |
| D | 1,000 | 2 | 0.340 | 0.340 | 0.340 | 0.340 |
| D | 1,300 | 2 | 0.380 | 0.380 | 0.380 | 0.380 |
| A | 1,000 | 3 | 0.400 | 0.350 | 0.300 | 0.150 |
| A | 1,300 | 3 | 0.450 | 0.450 | 0.450 | 0.430 |
| B | 1,000 | 3 | 0.400 | 0.350 | 0.300 | 0.150 |
| B | 1,300 | 3 | 0.450 | 0.450 | 0.450 | 0.450 |
| C | 1,000 | 3 | 0.595 | 0.595 | 0.595 | 0.595 |
| C | 1,300 | 3 | 0.600 | 0.600 | 0.600 | 0.600 |
| D | 1,000 | 3 | 0.595 | 0.595 | 0.595 | 0.595 |
| D | 1,300 | 3 | 0.600 | 0.600 | 0.600 | 0.690 |
| A | 1,000 | 4 | 0 (gasket ring was cut through) | | | |
| A | 1,300 | 4 | 0.500 | 0.500 | 0.500 | 0.500 |
| | | | (10% loss, since gasket ring was cut through) | | | |
| B | 1,000 | 4 | 0 (gasket ring was cut through) | | | |
| B | 1,300 | 4 | 0.500 | 0.500 | 0.500 | 0.500 |
| | | | (10% loss, since gasket ring was cut through) | | | |
| C | 1,000 | 4 | 0.620 | 0.620 | 0.620 | 0.620 |
| C | 1,300 | 4 | 0.640 | 0.640 | 0.640 | 0.640 |
| D | 1,000 | 4 | 0.620 | 0.620 | 0.620 | 0.620 |
| D | 1,300 | 4 | 0.640 | 0.640 | 0.640 | 0.640 |

I claim:
1. In a container closure comprising a closure member adapted to fit on and seal an opening of a container and a resilient heat-fluxed gasket ring or lining formed in situ in said member and adapted to mate with and seal the edge of said opening; the improvement comprising forming said gasket ring or lining by heat treating and fluxing in situ in said member a composition consisting essentially of a flowable pastelike mixture of 50 parts by weight of a resin selected from the group consisting of polyvinyl chloride, polymers of vinyl chloride with vinylic .e chloride and polymers of vinyl chloride with vinyl acetate, 10 — 100 parts by weight of a nonvolatile plasticizer in which said resin is insoluble except at elevated temperatures, and 5 — 200 parts by weight of a synthetic rubber, the latter in discrete particle form; the discrete particles of said synthetic rubber continuing to exist as such but being swollen by said plasticizer after said heat treating, the swollen state of said discrete particles increasing from a solid core outwardly with there being a smooth conversion from the solid to the liquid phase, and said composition being fused to a durable elastic gel containing said discrete particles by said heat treating.

2. An improved gasket ring or lining according to claim 1 wherein said nonvolatile plasticizer is a member selected from the group consisting of tricresylphosphate, acetyltributylcitrate, dioctylphthalate, di-iso-octylpthalate, di-nonylphthalate, di-decylphthalate, sebacic acid di-ester, and adipic acid di-ester.

3. An improved gasket ring or lining according to claim 1 wherein said synthetic rubber is a member selected from the group consisting of butadiene-styrene-copolymer, butadiene-acrylonitrile copolymer, polychloroprene, chlorosulfonated polyethylene, and mixtures thereof.

4. An improved gasket ring or lining according to claim 1 wherein said rubber has a particle size at which 100 percent thereof is able to pass through a Tyler sieve No. 14.

5. An improved gasket ring or lining according to claim 1 wherein said plastic resin composition contains a plasticizer in an amount of 20 —200 percent by weight referred to the polyvinyl chloride.

6. An improved gasket ring or lining according to claim 1 wherein said plastic resin composition additionally contains at least one member selected from the group consisting of lubricating agents, pigments and fillers.

7. An improved gasket ring or lining according to claim 1 wherein said plastic resin composition consists essentially of the following:
   50 parts by weight of polyvinyl chloride
   100 parts by weight of tri-cresyl phosphate
   50 parts by weight of butadiene acrylonitrile polymer
   0.5 parts by weight of a lubricant
   2 parts by weight of titanium dioxide 8. An improved gasket ring or lining according to claim 1 wherein said plastic resin composition consists essentially of the following:
   50 parts by weight of polyvinyl chloride
   40 parts by weight of di-iso-octylphthalate
   50 parts by weight of butadiene acrylonitrile copolymer
   0.5 parts by weight of a lubricant
   2 parts by weight of titanium dioxide 9. An improved gasket ring or lining according to claim 1 wherein said plastic resin composition consists essentially of the following:
   50 parts by weight of a copolymer of vinylchloride and vinylidene chloride
   100 parts by weight of didecyl phthalate
   200 parts by weight of butadiene-styrene copolymer
   5 parts by weight of iron oxide red
   5 parts by weight of a lubricating agent 10. An improved gasket ring or lining according to claim 1 wherein said plastic resin composition consists consists essentially of the following:
   30 parts by weight of polyvinyl chloride
   40 parts by weight of acetylbutylcitrate
   5 parts by weight of butadiene acrylonitrile copolymer
   1 part by weight of calcium recinoleate
   5 parts by weight of barium sulfate 11. An improved gasket ring or lining according to claim 1 wherein said plastic resin composition consists essentially of the following:
   30 parts by weight of polyvinyl chloride
   40 parts by weight of acetylbutylcitrate
   5 parts by weight of butadiene copolymer
   1 part by weight of calcium ricinoleate
   5 parts by weight of barium sulfate
   1 part by weight of oleic acid amide
   1 part by weight of paraffin.

PO-1050
(5/69)

UNITED STATES PATENT OFFICE
CERTIFICATE OF CORRECTION

Patent No. 3563402        Dated February 16, 1971

Inventor(s) Heinrich Arnold

It is certified that error appears in the above-identified patent and that said Letters Patent are hereby corrected as shown below:

Col. 1, line 63 (Spec. p. 4, line 2)

"aNd" should be -- and --

Col. 6, line 32 (Table 2) (Spec. p. 16)

First Group AA - DD, 6th figure down, under "Cooling Down" - "0.250" should be -- 0.350 --

Col. 6, line 67 (Spec. Claim 13, Amdt. of 1/16/70, line 10)

"vinylidene" - printing in Patent not clear

Col. 8, line 18 (Spec. Claim 10, line 2)

Delete one "consists"

line 23, correct the spelling of "ricinoleate"

Col. 8, line 30 (Spec. Claim 11, line 6)

add "acrylonitrile" after "butadiene"

Signed and sealed this 6th day of July 1971.

(SEAL)
Attest:

EDWARD M. FLETCHER, JR.
Attesting Officer

WILLIAM E. SCHUYLER, JR.
Commissioner of Patents